Feb. 10, 1925.

P. B. HUMPHREYS

INDICATING INSTRUMENT

Filed July 18, 1923

Inventor:
Paul B. Humphreys
by Roberts, Roberts & Cushman
Attys.

Feb. 10, 1925.
P. B. HUMPHREYS
INDICATING INSTRUMENT
Filed July 18, 1923  2 Sheets-Sheet 2
1,525,991
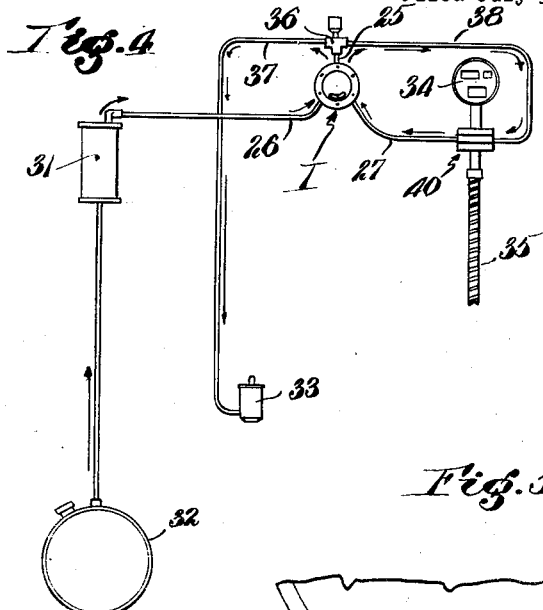
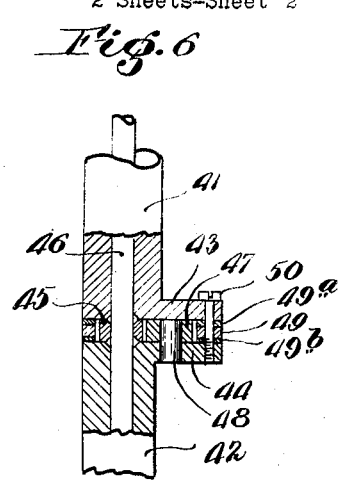
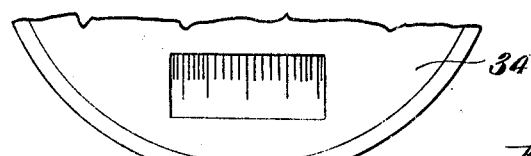
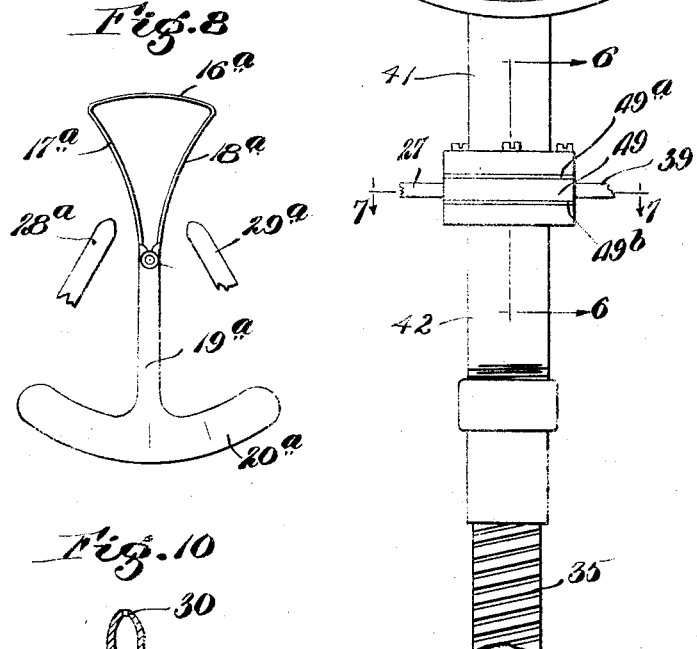
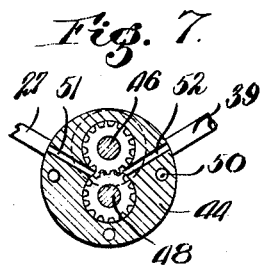
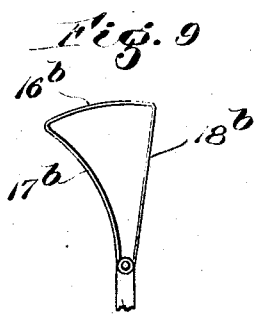
Inventor:
Paul B. Humphreys,
by Roberts, Roberts & Cushman
attys.

Patented Feb. 10, 1925.

1,525,991

UNITED STATES PATENT OFFICE.

PAUL B. HUMPHREYS, OF BOSTON, MASSACHUSETTS.

INDICATING INSTRUMENT.

Application filed July 18, 1923. Serial No. 652,374.

*To all whom it may concern:*

Be it known that I, PAUL B. HUMPHREYS, a citizen of the United States of America, and resident of Boston, in the county of Suffolk and State of Massachusetts, have invented new and useful Improvements in Indicating Instruments, of which the following is a specification.

This invention pertains to indicating apparatus and relates more particularly to apparatus useful in determining the economy of performance of a mechanical aggregate including a prime mover, being especially useful in connection with vehicles such for example as automobiles, aeroplanes, motor boats, etc. which employ an internal combustion engine as the primary source of power.

Without extended tests conducted by persons highly skilled in such matters, it is practically impossible to determine at any time whether such an aggregate or mechanism is performing at its highest efficiency or even to ascertain under what conditions or circumstances it may be expected to develop its most economical performance. Such aggregates of mechanism as above suggested are dependent upon a large number of variable factors for a proper performance, such factors including the quality of the motor fuel employed, the efficiency or setting of the carburetting device, the condition of the piston rings, valves, ignition system etc. of the prime mover or engine, and the suitability or sufficiency of the lubricating medium employed as well as the condition of the transmission mechanism interposed between the prime mover and the wheel, propeller or other device constituting the ultimate driven element of the mechanism.

In view of the difficulty of determining the most efficient performance and the frequency with which the various factors may change, it is probably true that most such mechanical aggregations are ordinarily operated far below their maximum efficiency resulting in loss of power, excessive consumption of fuel or both and in many instances by reason of the failure of the operator to recognize the poor perfomance resulting in long continued lack of necessary adjustments or repairs with constant rapid deterioration in the mechanical parts themselves.

The principal object of the present invention is to provide an arrangement and apparatus which may form a permanent part of such a mechanical aggregate or be applied temporarily thereto or to the prime mover alone if desired, by means of which the ordinary operator, although not highly trained in technical matters, may ascertain for himself at any time as to whether such mechanical aggregate or prime mover is performing at its highest efficiency, thus informing himself of the advisability of making such changes, adjustments, or repairs as may be necessary to restore the mechanism to proper operative condition.

Briefly stated the invention consists in the provision of means including an instrument or indicator which automatically integrates the quantity of fuel consumption against the speed at which the ultimate driven element, be it wheel, propeller or other device of the mechanism is actuated. Such an instrument may conveniently comprise a pointer, needle or similar element whose position is determined at any instant by the relative velocities of two opposed jets of fluids, the velocities of the respective jets depending respectively upon the quantity of the fuel being drawn into the engine and the quantity circulated by a pump or similar device actuated in timed relation to the wheel, propeller or other driving element.

In the accompanying drawings a preferred embodiment of the invention is illustrated and in such drawings:—

Fig. 4 is a diagrammatic view illustrating the application of the apparatus of the present invention to a motor vehicle;

Fig. 5 is an enlarged fragmentary elevation of a speedometer of ordinary type having applied thereto one element of the present invention;

Fig. 6 is a fragmentary detail view of a portion of the structure of Fig. 5 partly in section on the line 6—6 of said Fig.;

Fig. 7 is a horizontal section on the line 7—7 of Fig. 5;

Fig. 8 is a detached elevational fragmentary view illustrating a modified form of the movable element of the indicator;

Fig. 9 is a view similar to Fig. 8 but showing a further modification; and

Fig. 10 is an enlarged fragmentary longitudinal section of a delivery nozzle forming a part of the present invention.

Figure 1:
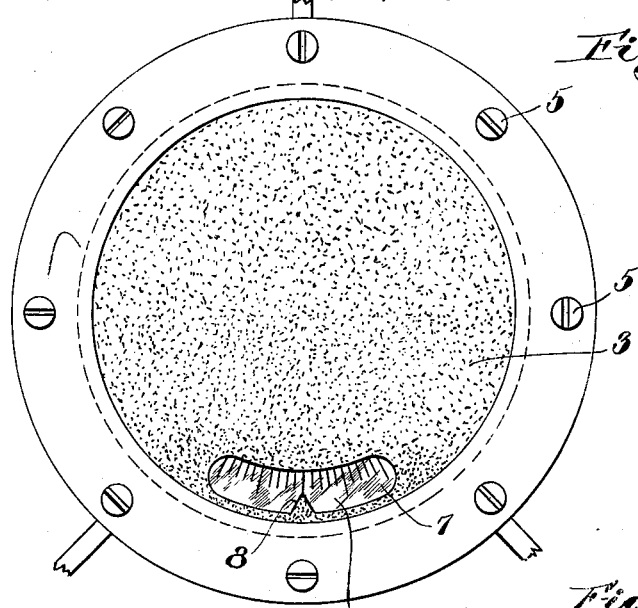
Fig. 1 is a front elevation of an indicator forming an element of the present invention, shown disconnected from associated parts.
Figure 2:
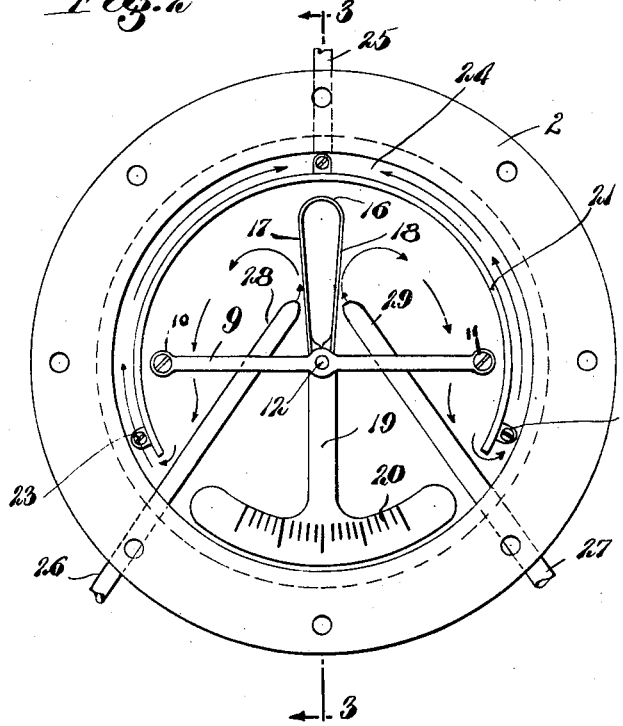
Fig. 2 is a front elevation similar to Fig. 1, but with the front plate of the indicator removed, to exhibit the interior construction.
Figure 3:
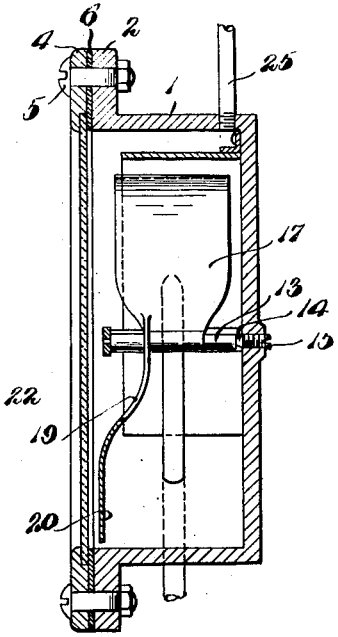
Fig. 3 is a vertical section on the line 3—3 of Fig. 2.

Referring particularly to Fig. 1 to 3 inclusive, the numeral 1 designates a casing preferably of metal and of circular form. This casing is provided at its forward edge with an outstanding radial flange 2. The front of the casing is normally closed by a cover plate 3, preferably of glass, secured in position by means of a retainer ring 4 connected to the flange 2 by screws or bolts 5. A gasket or washer 6 of any suitable material may be interposed between the ring 4 and the flange 2 so as to provide a fluid-tight joint between the glass cover and the casing.

The glass is preferably frosted or otherwise rendered non-transparent except at its lower point where a transparent portion or window 7 is provided. Preferably a pointer 8, which may consist of an extension of the frosted surface of the glass into the transparent area, is provided at the central part of the transparent area.

Within the casing a bridge member or support 9 is arranged, being secured at the points 10 and 11 respectively to the back wall of the casing. The central part of this bridge member extends forwardly toward the glass cover and is provided with a bearing opening at 12 for the front end of a shaft 13. The rear end of this shaft is provided with an axial cavity for the reception of the conical end 14 of a screw-threaded stud 15 adjustable in a threaded opening in the rear wall of the casing.

A lever arm or vane 16 is secured to the shaft 13 and projects upwardly from the latter. This vane is preferably formed of relatively thin sheet metal, such for example as aluminum, bent into U-form and having the ends of its arms secured to the shaft. The legs of the U-shaped vane provide oppositely disposed inclined surfaces 17, 18 for a purpose hereinafter described.

A second lever arm 19 is secured to the shaft 13, extending in substantial alignment with the vane 16 but diametrically opposite the latter. This arm 19 is bent forwardly so that its lower portion lies adjacent to the inner surface of the glass cover 3. An elongate graduated segment 20 is secured preferably integrally to the lower part of the arm 19, the graduations upon this segment appearing through the transparent portion or window 7 in the glass cover, and cooperating with the pointer 8 to indicate the position of the vane 16.

A guard plate 21 is arranged within the casing and is secured to the rear wall thereof by means of screws such as 22, 23 passing through lugs in the guard plate and extending into the rear wall of the casing. This guard plate is substantially concentric with the inner wall of the casing at the upper part of the latter and defines a passage or channel 24 open at opposite ends near the lower part of the casing and leading to the intake end of a delivery pipe 25 secured to the upper part of the casing. The guard plate prevents direct passage of fluid from the nozzles hereinafter described to the pipe 25, so that the outflowing fluid cannot affect the vane 16.

At points symmetrically opposite the vertical central plane of the casing, pipes 26, 27 enter the latter. These pipes terminate in converging nozzles 28, 29 respectively which are reduced at their extremities as indicated at 30, Fig. 10 and provided with restricted delivery openings. The rate of delivery of fluid through these openings may obviously be varied by changing the diameter of the openings or the contour of the interior surface thereof.

As indicated in Fig. 2 the nozzles 28 and 29 are so disposed that streams delivered therefrom are directed against the opposite surfaces 17, 18 respectively of the vane 16.

Referring to Fig. 4 the indicator just described is shown as forming a part of a fuel supply system such for example as that of an automobile. In this figure the indicator as a whole is designated by the letter I and the pipe 26 is shown as leading from the usual vacuum tank 31 of such a system which in turn receives fuel from a supply tank 32. The delivery pipe 25 above described is provided with a T 36 from one branch of which a pipe 37 extends to the carburetor 33.

A speedometer of usual type is shown at 34, having the flexible drive shaft 35. In accordance with the present invention the shaft 35 is not connected directly to the speedometer itself but a gear pump 40 is interposed between the speedometer and its shaft so as to be driven by the latter.

This gear pump, indicated at 40, comprises a pair of aligned sleeve members 41, 42 provided with circular eccentric enlargements or flanges 43, 44 respectively. A gear 45 is arranged between the opposed faces of the members 41, 42 and is secured to a shaft 46 which at its upper end is connected to the speedometer and at its lower end to the speedometer shaft. A second gear 47 is interposed between the flanges 43, 44, being mounted to turn on a stub shaft 48. A casing ring 49 is interposed between the members 41, 42 surrounding the gears 45 and 47 and providing an enclosed chamber in which such gears turn. Gaskets 49$^a$, 49$^b$ are interposed between the ring 49 and the parts 41, 42 to provide a tight joint between such parts which are connected by means of screws or bolts 50.

A pipe 38 extends from one branch of the T 36 to the gear pump and terminates in a passage 52 leading through the wall of the pump into the gear chamber. A second passage 51 extends from said chamber and is connected to the pipe 27.

The operation of the device is substantially as follows: The movement of the engine piston produces a vacuum in the tank 31 which withdraws fuel from the reservoir 32 and causes it to pass along the pipe 26 on its way to the carburetor 33. In passing to the carburetor the fuel must enter the casing I through the nozzle 28 and impinges against the surface 17 of the vane 16, thus tending to swing the vane in a clockwise direction as viewed in Fig. 2. Assuming that the operation has been continued for some time and that the casing is full of fuel and that fuel is passing out through the delivery pipe 25, it will be understood that some of the fuel will pass directly through the pipe 37 to the carburetor 33 while a portion of the fuel will be diverted through the pipe 38 and into the gear pump 40 which is driven when the car is in motion. Any fuel delivered by the gear pump passes through the pipe 27 and is discharged through the nozzle 29 against the surface 18 of the vane 16.

If the vehicle is standing still with the engine running, no fuel will be circulated through the pump 40 as the speedometer shaft 35 will be motionless and the nozzle 29 will not discharge any fuel against the surface 18 so that the entire pressure of the stream of the fuel delivered from the nozzle 28 will be available to swing the vane 16 in a clockwise direction, the amount of deflection being readable at the window 7. If on the other hand, assuming the other extreme case, the car should be coasting down hill with the engine not running, the gear pump 40 would deliver fuel through the nozzle 29 against the surface 18 of the vane, while no fuel would be delivered from the nozzle 28, with the result that the vane would be swung in a counter-clockwise direction under the full pressure of the stream delivered from the nozzle 29.

In the ordinary operation of the device however neither of the above conditions will ordinarily prevail, but the vane 16 will assume a position depending upon the relative force with which streams are delivered from the nozzles 28 and 29. The relative force of the streams will depend principally upon the rate of consumption of fuel as compared with the speed of the vehicle at any given time, so that the indicator automatically integrates the amount of fuel consumed against the speed.

With a car in perfect mechanical condition it is readily possible thus to determine that speed at which any given fuel gives most efficient results. On the other hand if this value has once been determined by noting the position of the graduated arm 20 of the indicator when such conditions prevail, it is possible to determine any failure of the mechanism of the vehicle to act with the highest efficiency by employing the standard fuel at a given speed and noting the position of the graduated element 20 of the indicator. For example if with a standard fuel at a predetermined best speed it is found that the vane 16 swings abnormally to the right as viewed in Fig. 2, it may be deduced that there is something wrong with the engine or other mechanical parts of the vehicle which causes a greater consumption of fuel than that indicated by previous tests to be necessary to secure the same performance. Likewise if the mechanical parts of the mechanism are in proper operative condition a poor quality of fuel may be noted in the same way. The device thus serves to notify the operator of the vehicle under all conditions as to whether he is securing the best results possible.

In Fig. 8 a modified form of vane is indicated at 16$^a$, such vane having the concavely curved surfaces 17$^a$, 18$^a$, respectively, against which the nozzles 28$^a$ and 29$^a$ deliver the streams of fuel. This vane is also furnished with the indicator arm 19$^a$ provided with a graduated segment 20$^a$. With this arrangement the action of the streams is somewhat augmented due to the curved surfaces against which the streams impinge.

In Fig. 9 a further modification is shown in which the vane 16$^b$ is provided with unsymmetrical impingement surfaces 17$^b$, 18$^b$ respectively. With such an arrangement a relatively weak stream delivering against the surface 17$^b$ may be made to balance the action of a stronger stream impinging against the substantially straight surface 18$^b$.

While the present invention is intended primarily for the use above indicated it is contemplated that it may be of general application and such broader application is contemplated as included within the scope of the appended claims.

I claim:

1. An instrument for use in determining the efficiency of performance of a mechanical aggregate, including a prime mover and a driven element, comprising a movable element subjected to opposing forces varying respectively in accordance with the quantity of fuel consumed by the prime mover and the speed of movement of the driven element, and means for indicating the resultant motion of said element.

2. An instrument for use in determining the efficiency of performance of a motor vehicle driven by an internal combustion engine comprising a movable element, means for subjecting said element to opposing fluid pressures varying respectively in intensity in accordance with the rate of fuel consumption of the engine and the speed of the vehicle, and means for indicating the resultant motion of said element.

3. An instrument of the class described comprising a case having a movable indicator device, and means for moving said device comprising an element positioned between two oppositely directed fluid delivery nozzles and responsive to variation in the relative intensity of fluid jets simultaneously delivered from said nozzles.

4. In combination with an internal combustion engine, a fluid pump driven thereby, and an indicating instrument comprising a movable part, and means for simultaneously directing opposing streams of fluid against said part, one of said streams being that delivered by the pump and the other consisting of the liquid fuel on its way to the engine.

5. In combination with a vehicle driven by an internal combustion engine, and provided with speed indicating means, a fluid propelling device actuated in time with the speed indicating means, and a casing containing a swinging vane arranged between opposed orifices, one of said orifices delivering fluid from the fluid-propelling device and the other delivering fuel on its way to the engine.

6. In combination with a vehicle driven by an internal combustion engine and provided with a speedometer, a fluid pump actuated in timed relation to the speedometer, and an instrument comprising a casing having opposed nozzles, one delivering fluid from the pump and the other delivering fuel on its way to the engine, and a movable part interposed between said nozzles and positioned in accordance with the relative intensity of flow from the respective nozzles.

7. In combination with a vehicle driven by an internal combustion engine and provided with a speedometer and a speedometer shaft, a fluid pump driven by said shaft, and an instrument comprising a fluid tight casing having opposed inlets and an outlet, said outlet communicating with the intake of the engine and one inlet being connected with the fuel supply and the other with the delivery of the pump, and a movable part interposed between the inlets and positioned in accordance with the relative intensity of the streams entering the respective inlets.

8. In combination with a vehicle driven by an internal combustion engine and provided with a speedometer and a speedometer shaft, a fluid pump having a shaft connected at one end to the speedometer and the other to the speedometer shaft and driven by the latter, and an instrument comprising a pair of opposed nozzles, one nozzle delivering a jet of fluid discharged by the pump and the other delivering a jet of fuel on its way to the engine, and a pivoted vane arranged between said nozzles in such position that said jets impinge against its opposite sides.

9. In combination with an internal combustion engine, a fuel supply receptacle, an indicating instrument comprising a casing, a duct for fuel leading from the casing to the engine, a conduit conducting fuel from the supply receptacle to the casing, a conduit conducting fuel from a pump operated by said engine to the casing, and a movable member within the casing and in the path of the fuel discharged by said conduits and index means actuated by the movable member.

10. In combination with an internal combustion engine, an instrument comprising a casing having a movable part, indicating means carried thereby, means for directing fuel on its way to the engine against the said part thereby tending to move said part and means governed by the operation of said engine for opposing said motion.

11. In combination with an internal combustion engine a fuel supply, a pump, means for driving the pump, a casing provided with an outlet opening, a conduit leading from the outlet opening and having branches leading to the engine and pump, respectively, a conduit leading from the fuel supply to the casing and terminating in a nozzle disposed therein, a delivery duct leading from the pump to the casing and terminating in a nozzle directed oppositely to the front nozzle, and a pivoted vane within the casing disposed between said nozzles.

12. In combination with a prime mover, means for supplying such prime mover with actuating fluid, a movable part arranged in the path of the fluid on its way to the prime mover, and under the influence of said fluid tending to move it in one direction, and means operating with varying force in accordance with the speed of the prime mover, tending to move said part in the opposite direction.

13. In combination with a prime mover, means for supplying such prime mover with actuating fluid, a movable part arranged in the path of the fluid on its way to the prime mover, and under the influence of said fluid tending to move it in one direction, and means for directing a stream of fluid in the opposite direction against said part with a velocity varying with the speed of the prime mover.

14. An instrument of the class described comprising a casing having oppositely directed inlet openings and an outlet opening, a lever comprising a vane-like arm and an indicator arm, and means for directing fluid entering the casing through the respective inlet openings simultaneously against the opposite sides of the vane-like arm.

15. An instrument of the class described comprising a casing having a lever pivotally mounted therein, said lever having a vane-like arm and an indicating arm, a pair of nozzles arranged simultaneously to discharge fluid jets against opposite sides of the vane-like arm, and means providing an outlet from the casing.

16. An instrument of the class described comprising a substantially circular casing having an outlet opening, a lever pivoted centrally within the casing provided with a vane-like arm and an indicator arm, means for delivering streams of fluid against opposite sides of the vane-like arm, and means interposed between said outlet opening and the vane-like arm to prevent the direct passage of fluid from the vicinity of the latter to the outlet opening.

17. An instrument of the class described comprising a substantially circular casing having an outlet opening, inlet openings disposed symmetrically with respect to the outlet opening, nozzles projecting inwardly from the respective inlet openings, a movable vane interposed between the nozzles, and a guard device to prevent direct passage of fluid from the nozzles to the outlet opening.

18. An instrument of the class described comprising a substantially circular casing having an outlet opening in the vertical plane of its center, inlet nozzles projecting oppositely into the casing from its peripheral wall, said nozzles being disposed symmetrically with respect to the outlet opening, and a guard device spaced from the inner surface of the casing and extending circumferentially in from the outlet opening to prevent direct passage of fluid from the nozzles to such opening.

19. An instrument of the class described comprising a substantially circular casing having an outlet at its top and inlets at symmetrically opposite points in its peripheral surface, nozzles projecting inwardly from the respective inlets, a movable vane disposed between the nozzles and an arcuate guard member spaced from the inner surface of the casing below the outlet opening to prevent direct passage of fluid from the nozzles to such outlet opening.

Signed by me at Coronado, California, this 3rd day of July, 1923.

PAUL B. HUMPHREYS.